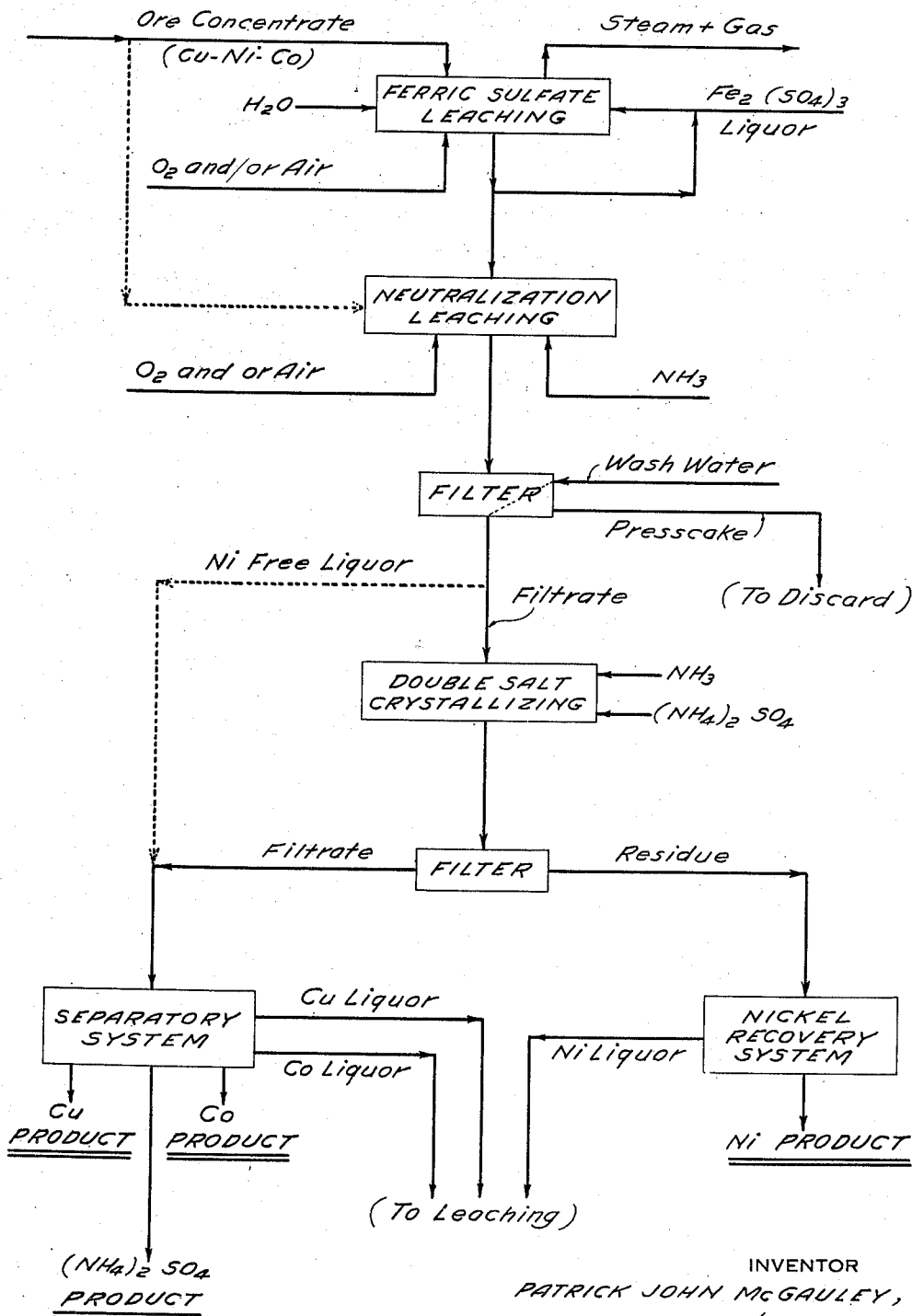

UNITED STATES PATENT OFFICE 2,647,827

RECOVERY OF Cu AND Ni FROM FLOTATION CONCENTRATE

Patrick J. McGauley, Glen Cove, N. Y., assignor to Chemical Construction Corporation, New York, N. Y., a corporation of Delaware Application June 4, 1949, Serial No. 97,226

10 Claims. (Cl. 75—103)

The present invention is concerned with the leaching of copper-bearing ore concentrates. It deals with leaching by oxidation of copper-bearing concentrates. Particularly, it is concerned with treating concentrates containing, in addition to copper, such extraneous metals such as iron, nickel and cobalt. More specifically, it presents a procedure which both increases the rate at which effective leaching may be carried out and simplifies the problem of isolating the nickel content.

In recent years, several proposals have been advanced for processes in which copper values can be recovered directly from copper-bearing materials by leaching and precipitation. Since most ores, as mined, contain gangue diluents as their far greatest proportion, the process is ordinarily, but not necessarily, applied to an ore concentrate. In the latter, the bulk of the diluents have been eliminated by some method such as gravity concentration, froth flotation, and the like. This pre-concentration forms no part of the present invention.

The leaching steps may take varied forms, depending on the ore. For example, concentrates of oxidized copper minerals may be leached directly with ammoniacal liquors. However, such copper ores usually either contain or occur in the same mining property with copper sulfide minerals. Accordingly, in many operations, the action of the leaching liquor is supplemented by oxidation to convert insoluble sulfides to soluble sulfates. Oxidation is usually accomplished by passing air and/or oxygen at some convenient pressure through the leaching system.

In attempting to operate such processes, particularly when using ammoniacal leaching, treatment of concentrates fresh from the mill is found to be much slower and more ineffective than leaching of the well-aged concentrates. However, facilities for storing and aging sufficient quantities of concentrate to take full advantage of this apparent beneficial change on aging would increase to an impractical degree the expense of the installation. This has been found to be a serious drawback.

Further, it may be desirable to treat by such procedures many concentrates which contain, in addition to copper-bearing minerals, many other metals. These, usually as sulfides, may include iron, cobalt and nickel, for example. So far as copper recovery is concerned, iron in particular is a necessary evil which must be overcome. Cobalt and nickel have a high intrinsic value and if possible it is also desirable that they be isolated in a commercially useful form. Previous proposals for leaching systems of this type have made no adequate provision, either for elimination of iron or separation and recovery of the nickel and/or cobalt values. This in itself is a serious drawback, since the value of the cobalt and nickel content in some ores may approximate or exceed that of the copper content.

It is, therefore, the principal object of the present invention to devise an operation whereby leaching may be carried out on newly-concentrated ores as rapidly and efficiently as on aged concentrates. Such a process should involve the use of only commonly-available materials, it should not inordinately increase the requisite apparatus, and it should be capable of being carried out with a minimum amount of personal supervision.

It is a further object of the present invention to carry out the improved leaching operations under conditions which favor the separation and subsequent isolation of the nickel values in the ore concentrate, if any such values are present.

In general, the objects of the present invention are met by a straightforward process. It employs a two-step leaching, an acidic leaching followed by a neutralizing leach. Oxidation is employed in each. The resultant leached slurry, partially neutralized to a pH at which all iron is dropped from solution, is filtered and the iron-containing presscake washed and discarded. If nickel is present, the filtrate and washings are then treated to precipitate therefrom an insoluble nickel-ammonium complex salt. The latter is filtered out. The copper, the ammonium sulfate formed during neutralization and any cobalt values present will be in and may be recovered from the filtrate.

The process of the present invention may be more readily understood and described with reference to the accompanying drawing. The latter constitutes a flowsheet showing in simplified form the principal operations in the flow scheme which constitutes the process of the present invention.

As will be seen from the drawing, the feed material to the process of the present invention is shown as an ore concentrate. Such a concentrate, containing copper-, nickel-, cobalt- and iron-bearing minerals, excellently illustrates the ore treatment used in the process of the present invention. The discussion will be made in connection therewith. It should be noted, however, that the advantages of the present process are not necessarily limited to the treatment of such materials.

In the first actual step of the present process, the ore concentrate is subjected to a hot ferric sulfate leaching. The concentrate is mixed with an aqueous ferric sulfate solution and oxygen and/or air is blown therethrough under any convenient pressure for sufficient time to extract most of the metal values. Once instituted, oxidation is exothermic and there is no problem of supplying heat. In many cases, it may be necessary to bleed steam to prevent the temperature and pressure exceeding that which can be conveniently handled in the apparatus. In such cases, additional water as make-up must also be introduced into the system. The temperature and pressure used is not critical. Usually, however, it will be found that pressures below about 300–325 pounds per square inch gauge are satisfactory and higher pressures should be avoided as they require heavier apparatus and tend to increase installation and operating costs.

As noted above, and as shown in the accompanying flowsheet, the second operation may be designated as a neutralization leach. It may be carried out either in the same apparatus used for the hot ferric sulfate leaching or, as shown, the entire leach slurry may be transferred to a different tank. Whatever the apparatus used, ammonia and again oxygen and/or air are introduced into the slurry.

In this operation, neutralization is far from complete. Only sufficient ammonia should be introduced to eliminate any iron salts dissolved in the first leaching operation. The dissolved iron salts are converted to insoluble ferric hydroxide. This step also has the additional advantage that metal values not previously dissolved will be leached during this partial neutralization. For this reason, the operation is designated as a neutralizing leach. It must be done in the presence of oxidizable sulfides if the ammonia is to do any additional leaching. The sulfides may be in the slurry from the first leaching or they may be added as additional feed as optionally shown in dotted lines on the drawing.

While the purpose of this step, as noted above, is to eliminate any dissolved iron by precipitation of iron oxides or hydroxides, this is an inconvenient method of designation. In most cases, it will be found that the neutralizing leach has been carried to the proper extent when the pH of the liquor becomes about 3.0–4.0. There should be sufficient oxidation to insure substantially all the iron is in ferric condition, particularly at the lower pH's of this range. While this range is about the nominal to be expected, if the solution is sufficiently dilute in $NH_3$ sulfates, the pH may be taken higher, possibly even as high as 5.0.

Completion of the neutralizing leach produces a mixed slurry. This latter is subjected to filtration and the filter cake is washed. The filter cake will contain gangue materials and the precipitated ferric hydroxide. So far as the present invention is concerned, this presscake is discarded and is therefore removed from the system.

Filtrate and wash-water, after removal of the ferric precipitate, contain the metal values which were dissolved during the leaching operations. In many operations, where the process of the present invention is applicable, the ore concentrate will contain nickel. Where this is true, nickel is most readily separated from other metals at this stage in the procedure.

To accomplish this result, the filtrate is treated as may be necessary with additional ammonia and with ammonium sulfate. It has been found, in accordance with the present invention, that at a suitable pH range, in a solution containing sufficient dissolved ammonium sulfate, the other metals such as copper and cobalt will remain in solution but nickel sulfate will precipitate quantitatively as a nickel sulfate-ammonium sulfate double salt. Accordingly, enough ammonium salt to provide common ions and saturate the solution is added. For example, ordinary operating temperatures may run from about 25–125° C. At these levels, above about 15–20% of ammonium salt should be provided. On the other hand, too great a salt concentration is unnecessary and perhaps should be avoided, as decreasing the amount of copper or cobalt salt soluble in the liquor. Usually but a slight pH adjustment will be necessary. A preferred range will be found to be about 4.0–5.0. It may be as high as 6.0–6.4. Since $NH_3$ will be added to insure salt precipitation, this will be almost automatically insured. In this range, the nickel-ammonium double salt will crystallize out, giving rise to the indicated designation in the flowsheet of the operation as nickel salt crystallizing.

The slurry resulting from the crystallizing operation is again filtered. Two products are produced: the filtrate containing the copper values and the ammonium sulfate, and any cobalt values which may be in the ore concentrate being treated, and a presscake which will contain the nickel values. Each is given a separate treatment.

The filtrate containing the copper values is sent to some system in which the copper values can be separated and recovered. This is generically indicated in the drawing as a separatory system. Its exact arrangement may take any one of a number of forms.

A particularly suitable procedure, although forming no part of the present invention, constitutes the subject-matter of my copending application for United States Letters Patent, Serial No. 97,228, filed on even date. Whatever the nature of the separatory system, copper is removed therefrom, preferably as pure copper metal powder, as is shown in the drawing.

Similarly, a pure cobalt powder which may contain cobalt oxide but is substantially free from other metals is produced. The third product constitutes ammonium sulfate crystals, which provide for the salvage of the ammonia utilized. Where, as suggested in the drawing, the copper and cobalt are to be produced as powders, it is impossible to precipitate all of the metal values which are put into the separatory system without an undesirable sacrifice of purity. For this reason, the drawing shows copper-containing and cobalt-containing liquors being returned to the leach operation. They will ordinarily be returned to the neutralizing leach but may be returned directly to the initial operations if so desired.

One alternative flow is shown on the drawing. The operation may be conceivably applied to ore concentrates in which no nickel is present. If this is so, the nickel salt crystallizing step with its concomitant filter is not required. In that case, the filtrate from the operation following the neutralization may be passed directly to the copper separatory system.

The presscake, containing the nickel salts, is sent to some suitable nickel recovery system. Like the copper separatory system, this is not limited in the present invention to any particular process of apparatus arrangement. The operations may be carried out as desired. A particularly suitable nickel recovery system forms the subject-matter of my copending application for United States Letters Patent, Serial No. 97,227, filed of even date.

Whatever the particular system used, nickel is isolated as a nickel product, preferably as shown, this will be a metallic nickel powder. The latter also may contain nickel oxide but will be substantially free of other metals. As in the case of the copper and the cobalt, it is undesirable to precipitate out all of the available nickel in one pass through such a system. Residual nickel-bearing liquors, therefore, are recycled as shown. Again, the recycling usually will be to the neutralization leach unit but may be carried back to the original leaching, if so desired.

It is believed that the operation of the process of the present invention is clearly apparent from the foregoing discussion. Two points might be worth additional notice. Ferric sulfate solution, to accomplish the initial oxidation-leaching, once the operation has been brought into operation equilibrium, is simply obtained by recycling a part of the exit liquors. Such a return is shown on the flow sheet.

A second point which should be noted is the addition of ammonium salt to the liquor during the precipitation of the nickel-ammonium double salt. This is done primarily to add additional common ions to the solution. As noted above, it has now been found that a nickel-ammonium double salt is substantially insoluble in a solution of an ammonium salt of the same acid. The sulfate of this invention is completely insoluble in a sufficiently concentrated solution of ammonium sulfate. For this reason, the salt added when the ammonium sulfate formed in situ is not sufficient to insure total precipitation is shown on the flowsheet to be ammonium sulfate. One of the by-products of the overall process is ammonium sulfate. Therefore, the use of part of the latter to insure separation of the nickel double salt provides no operational difficulties. While another ammonium salt might be used, it is impractical to do so since sulfuric acid and hence sulfates are inherently produced in the process.

The amount of ammonia and/or ammonium salt which should be added and the resulting pH drop are not easily given minimum limitations. Nickel-ammonium sulfate double salt will precipitate quantitatively at a pH of about 4.0–6.4 from a sufficiently concentrated solution of $(NH_4)_2SO_4$, whereas copper and cobalt, having a higher solubility, may be retained. However, to precipitate only nickel, the ratios of copper and cobalt must not be too high with respect to the nickel and the ammonium sulfate is solution. Where the amounts of copper and/or cobalt which it may be desirable to retain in solution approach or exceed the critical ratios, prevention of their precipitation may be controlled by suitable dilution with respect to copper and/or cobalt, as the case may be. The amount of dilution, if any, is easily determined. In most cases, however, this will not be necessary.

At a slightly lower, but overlapping, pH range, precipitation of cobalt is more favored. For example, in the case of nickel, at above a pH about 6.4 the $Ni^{++}$ ion becomes $Ni(NH_4)_x^{++}$. The value of x will vary from two to six, depending on the amount of available ammonia. On the other hand, at below about pH 4.0, the nickel-ammonium double salt does not form. For cobalt the corresponding pH values are about 5.5 and 3.5 respectively. Accordingly, where it is neither necessary nor desirable to first precipitate nickel, either because it is not present in appreciable amounts or because a mixture is satisfactory, a somewhat lower pH range may be utilized. It will be seen that the above discussions with respect to nickel elimination may, if so desired, be readily extended to cover cobalt and mixtures of cobalt and nickel.

It is not readily possible to accurately define the desirable ammonium sulfate concentration. It will depend to a considerable extent on the materials being treated and the temperature used. The exact conditions must be determined for each case. In general, and taking about 25° C. as illustrative, nickel sulfate is soluble to less than 1% by weight in about 9–10% ammonium sulfate solution, and insoluble to any appreciable extent in about 20% solution. In the same ammonium sulfate concentration ranges, cobalt sulfates vary in solubility from about 6% down to about 1.3% and copper sulfate from about 10% down to about 2%. Cobalt sulfate becomes insoluble in about 40–45% ammonium sulfate solutions. Copper sulfate remains appreciably soluble in solutions of 50% ammonium sulfate or higher.

I claim:

1. In treating copper-bearing minerals mixtures containing at least one additional "metal"-bearing mineral, said "metal" being selected from the group consisting of nickel, cobalt, and mixtures thereof, at least a part of said minerals being sulfides, by subjecting the mixture to an acidic oxidation leach in the presence of ferric sulfate to obtain a solution of soluble copper and "metal" sulfates, the improved procedure for eliminating iron from said solution, which comprises the steps of: conducting said acidic oxidation leaching; subjecting the resultant slurry to an additional oxidation leach in the presence of oxidizable sulfides; during said additional leaching, introducing ammonia into the liquor in only sufficient amount to convert substantially all the dissolved iron sulfates into insoluble ferric hydroxide, and filtering the resultant slurry, whereby substantially all the iron in the slurry is removed in the presscake.

2. In treating copper-bearing minerals mixtures containing at least one additional "metal"-bearing mineral, said "metal" being selected from the group consisting of nickel, cobalt, and mixtures thereof, at least a part of said minerals being sulfides, by subjecting the mixture to an acidic oxidation leach in the presence of ferric sulfate to obtain a solution of soluble copper and "metal" sulfate, the improved procedure for eliminating iron and "metal" from said solution, which comprises the steps of: conducting said acidic oxidation leaching; subjecting the resultant slurry to an additional oxidation leach in the presence of oxidizable sulfides; during said additional leaching, introducing ammonia into the liquor in only sufficient amount to convert substantially all the dissolved iron sulfates into insoluble ferric hydroxide; filtering the resultant slurry, whereby substantially all the iron in the slurry is removed in the presscake; adding to the filtrate ammonium sulfate and additional ammonia in sufficient amounts to produce in the solution an ammonium sulfate concentration of at least 9% and sufficient diluent to produce a copper concentration not exceeding the solubility of copper sulfate at the ammonium sulfate concentration, whereby dissolved "metal" sulfate is converted to and precipitated as insoluble "metal"-ammonium sulfate double salt, but any copper sulfate remains dissolved, and collecting the precipitated "metal"-ammonium sulfate double salt.

3. A process according to claim 2 in which the "metal" is cobalt precipitated at a pH of about 3.5 to 5.5.

4. A process according to claim 2 in which the "metals" are nickel and cobalt, the cobalt being precipitated at a suitable pH after the nickel is precipitated at a pH of about 5.5 to 6.4.

5. A process according to claim 2 in which cobalt and nickel are conjointly precipitated at a pH of about 4.0 to 5.5.

6. A process according to claim 2 in which additional preformed ammonium sulfate is added to the filtrate in the precipitation of "metal"-ammonium double salt.

7. A process according to claim 2 in which the feed concentrate also contains at least one iron sulfide.

8. A process according to claim 2 in which a portion of the exit liquor from the initial acidic oxidation is recycled to provide ferric sulfate for the next cycle.

9. A process according to claim 2 in which the final filtrate is treated to separate the copper content therefrom and the resultant liquor is treated to crystallize ammonium sulfate therefrom.

10. A process according to claim 9 in which product ammonium sulfate is used in a succeeding cycle to precipitate "metal"-ammonium sulfate.

PATRICK J. McGAULEY.

References Cited in the file of this patent

UNITED STATES PATENTS

| Number | Name | Date |
|--------|------|------|
| 1,039,861 | Wells | Oct. 1, 1912 |
| 1,565,353 | Estelle | Dec. 15, 1925 |

FOREIGN PATENTS

| Number | Country | Date |
|--------|---------|------|
| 15,849 | Great Britain | 1911 |